(12) United States Patent
Liao

(10) Patent No.: US 10,787,012 B2
(45) Date of Patent: Sep. 29, 2020

(54) AUTOMATIC PROCESSING DEVICE INCLUDING PRINTING DEVICE FOR PRINTING ON CARBON FIBER TUBE

(71) Applicant: Dongguan Jinming Carbon Fiber Technology Co., Ltd., Dongguan (CN)

(72) Inventor: Bin Liao, Dongguan (CN)

(73) Assignee: Dongguan Jinming Carbon Fiber Technology Co., Ltd., Dongguan (CN)

( * ) Notice: Subject to any disclaimer, the term of this patent is extended or adjusted under 35 U.S.C. 154(b) by 241 days.

(21) Appl. No.: 15/942,584

(22) Filed: Apr. 2, 2018

(65) Prior Publication Data

US 2018/0311985 A1    Nov. 1, 2018

Related U.S. Application Data

(63) Continuation of application No. PCT/CN2017/102613, filed on Sep. 21, 2017.

(30) Foreign Application Priority Data

Apr. 27, 2017    (CN) .......................... 2017 1 02880796

(51) Int. Cl.
*B41F 17/10*    (2006.01)
*B29D 23/00*    (2006.01)
(Continued)

(52) U.S. Cl.
CPC ................. *B41M 1/34* (2013.01); *B05D 1/18* (2013.01); *B05D 3/002* (2013.01); *B05D 3/0218* (2013.01);
(Continued)

(58) Field of Classification Search
CPC .. B41M 1/34; B41M 1/40; B05D 1/18; B05D 3/12; B05D 3/00; B05D 3/002;
(Continued)

(56) References Cited

U.S. PATENT DOCUMENTS

| 4,911,072 A | * | 3/1990 | Dixon ................... B41F 9/1063 |
| | | | 101/157 |
| 5,179,896 A | * | 1/1993 | Copeland ................ B41F 17/10 |
| | | | 101/6 |

FOREIGN PATENT DOCUMENTS

WO    WO-2013117965 A1 *    8/2013    ........... B29D 23/001

* cited by examiner

*Primary Examiner* — Leslie J Evanisko
(74) *Attorney, Agent, or Firm* — Hemisphere Law, PLLC; Zhigang Ma

(57) ABSTRACT

An automatic processing device of a carbon fiber tube includes a polishing device, a washing device, a first drying device, a printing device, a painting device and a second drying device centrally disposed along an identical axis in sequence to form an automatic production line. The polishing device includes feeding mechanisms disposed on two sides of a frame respectively and a positioning-polishing mechanism disposed between the feeding mechanisms. The printing device includes a supporting mechanism and a rolling-printing mechanism mounted on the frame. The disclosure aims at providing an automatic processing device of a carbon fiber tube and a processing method thereof, combining the polishing device, the printing device and the painting device as a whole. Separate processes such as polishing, printing and painting of the conventional carbon fiber tube are integrated to achieve the automatic production in the production line, which can significantly speed up the schedule.

8 Claims, 10 Drawing Sheets

(51) Int. Cl.
*B24B 21/02* (2006.01)
*B41M 1/34* (2006.01)
*B05D 1/18* (2006.01)
*B05D 3/00* (2006.01)
*B05D 3/02* (2006.01)
*B05D 3/12* (2006.01)
*C04B 41/00* (2006.01)
*B41M 1/40* (2006.01)
*B05C 3/12* (2006.01)

(52) U.S. Cl.
CPC ............. *B05D 3/0254* (2013.01); *B05D 3/12* (2013.01); *B24B 21/02* (2013.01); *C04B 41/00* (2013.01); *B05C 3/12* (2013.01); *B41M 1/40* (2013.01)

(58) Field of Classification Search
CPC ...... B05D 3/02; B05D 3/0218; B05D 3/0254; B05C 3/12; B41F 17/10; B24B 21/18; B24B 21/008; B24B 21/025; B24B 41/005
USPC .......................................................... 101/35
See application file for complete search history.

AUTOMATIC PROCESSING DEVICE INCLUDING PRINTING DEVICE FOR PRINTING ON CARBON FIBER TUBE

FIELD OF THE DISCLOSURE

The disclosure relates to a carbon fiber tube manufacturing field, and more particularly to a highly automatic processing device of a carbon fiber tube integrated with polishing and printing, and a processing method thereof.

BACKGROUND

As the progressive enhancement of society and development of science as well as technology, the higher requirement on industrial automation is gradually raised. Novel materials progressively substitute the conventional metal to be the mainstream trend of the society. Carbon fiber, as one representative of novel materials, has various merits such as thermo-resistance, corrosion resistance, and wear resistance. It is further widely applied in diverse fields of industries or lives such as aviation and traffic. The carbon fiber tube needs to undergo two processes, which are weaving and re-processing after weaving. The subsequent processes include polishing, printing and painting the surface. The carbon fiber tube requests to be placed in separately corresponding devices in sequence for polishing, printing and painting in the conventional processing device. The processes are enormous and the carbon fiber tube has to be frequently transferred during processing, which are not adaptive for mass production due to the severe delay in production schedule, prolongation in production cycle, and elevation in production cost, failing in meeting the requirements for automatically industrial production, daily maintenance and practicability.

SUMMARY

In order to solve the problems above, the disclosure aims at providing a highly automatic processing device of a carbon fiber tube integrated with polishing and printing, and a processing method thereof.

In order to achieve the objective above, the disclosure provides an automatic processing device of a carbon fiber tube, including a polishing device, a washing device, a first drying device, a printing device, a painting device and a second drying device sequentially arranged in that order and processing centers thereof being on an identical axis to form an automatic production line.

The polishing device includes feeding mechanisms disposed on two sides of a frame respectively and a positioning-polishing mechanism disposed between the feeding mechanisms. The positioning-polishing mechanism includes a number of polishing assemblies coaxially disposed and spaced apart from one another, each of the polishing assemblies is disposed with a positioning plate. An adjusting module and a polishing module are disposed on two sides of the positioning plate respectively. The polishing module is disposed with a number of wheels mounted on the positioning plate. The wheels are wrapped by a slidable polishing band, and the polishing band is formed with an accommodating cavity configured to hold a product to be polished thereon.

The printing device includes a supporting mechanism and a rolling-printing mechanism mounted on the frame. The frame is disposed with a mounting board. The supporting mechanism is assembled on the mounting board. The rolling-printing mechanism is located above the supporting mechanism and securely assembled on the frame by a mounting frame, and the mounting frame is disposed with a roller therein. An adjusting roller and a heating tube are disposed on two sides of the roller respectively. The mounting frame is disposed with a number of pulling rods mutually parallel. The roller, the adjusting roller and the pulling rods are sequentially covered by a printing belt.

The feeding mechanism includes a slide rail mounted on the frame and pulling assemblies disposed symmetrically in the slide rail. The pulling assembly is disposed with at least two pulling wheels spaced apart and mutually symmetrical. Each of the at least two pulling wheels is disposed with an adjusting assembly that is independent. The adjusting assembly includes a fixating frame configured to secure the at least two pulling wheels, a pressing plate and an adjusting spring disposed on the fixating frame. The fixating frame is mounted on the slide rail by a slide block, and regulated to slip along the slide rail by the adjusting spring.

The positioning plate overall appears a Y shape. A top end of the positioning plate is integrally disposed with mounting arms mutually symmetrical, and a middle section of the positioning plate between the mounting arms is defined with a slide groove. The polishing module includes first rollers securely disposed on the mounting arms respectively and a second roller disposed movably in the slide groove. The adjusting module includes a slide rail mounted on the positioning plate and a number of slide blocks mounted on the slide rail. The slide blocks are disposed with a first slide assembly and a second slide assembly respectively.

The first slide assembly includes a fixating plate, an adjusting plate and a reset spring. The fixating plate is securely mounted on the positioning plate; the adjusting plate is movably mounted on one of the plurality of slide blocks. The reset spring is mounted between the fixating plate and the adjusting plate; the adjusting plate is connected to the second roller by a positioning rod to allow the second roller to move with the adjusting plate along the slide groove.

The second slide assembly includes a pushing plate and a slide rod mounted on the pushing plate. The pushing plate is mounted on one of the slide blocks, and the pushing plate is disposed with a positioning lock.

The washing device includes a tank and a number of nozzles disposed in the tank. The nozzles are evenly distributed on each corner in the tank to permit the product to be entirely placed among the nozzles for achieving omni-directional spraying and painting.

The first drying device and the second drying device each include covers securely mounted on two sides of the frame. Each of the covers is disposed with a drying mechanism therein. The drying mechanism includes a heating tube mounted in the cover and a gas tube inserted in the cover.

The painting device is disposed with a tray. Vents are defined in two sides of the tray respectively in an identical axis, and each of the vents is disposed with a sealing ring therein to prevent overflow.

A processing method of a carbon fiber tube includes following steps: (1) a polishing step: placing a carbon fiber tube after being woven and processed on a polishing device, and polishing the carbon fiber tube thoroughly by polishing mechanisms of the polishing device located in four directions during a feeding process of a feeding mechanism; (2) a washing step: washing a surface of the carbon fiber tube after being polished to wipe out polished powders on the surface; (3) a first drying step: drying the carbon fiber tube after being washed to prepare a dry status for a next step; (4)

a printing step: printing a pattern on a successive printing belt to the surface of the carbon fiber tube by rolling the successive printing belt with the pattern to be printed over a roller in a rotation process of the roller; (5) a painting step: sending the carbon fiber tube after being printed with the pattern into a painting device, in the transmission process of the carbon fiber tube, painting the carbon fiber tube by passing through paint in a tray; and (6) a second drying step: re-drying the carbon fiber tube after being painted to form a final product, and completing all processes.

A cut step is further included. After completing all the processes, the carbon fiber tube is cut in a piecewise manner based on practical manufacturing requirements.

The disclosure aims at providing an automatic processing device of a carbon fiber tube and a processing method thereof, combining the polishing device, the printing device and the painting device as a whole. Separate processes such as polishing, printing and painting of the conventional carbon fiber tube are integrated to achieve the automatic production in the production line, which can significantly speed up the schedule, reduce the production cycle, and lower the budget in production. The entire structure is simple for daily maintenance and repair with high automatization and practicability.

1—polishing device; 2—washing device; 3—first drying device; 4—printing device; 5—painting device; 6—second drying device; 7—feeding mechanism; 8—positioning-polishing mechanism; 9—polishing assembly; 10—positioning plate; 11—adjusting module; 12—polishing module; 13—wheel; 14—polishing band; 15—accommodating cavity; 16—supporting mechanism; 17—rolling-printing mechanism; 18—mounting board; 19—roller; 20—adjusting roller; 21—pulling rod; 22—slide rail; 23—pulling assembly; 24—pulling wheel; 25—adjusting assembly; 26—fixating frame; 27—pressing plate; 28—adjusting spring; 29—slide block; 30—mounting arm; 31—slide groove; 32—first roller; 33—second roller; 34—first slide assembly; 35—second slide assembly; 36—fixating plate; 37—adjusting plate; 38—reset spring; 39—pushing plate; 40—slide rod; 41—positioning lock; 42—tank; 43—nozzle; 44—cover; 45—drying mechanism; 46—heating tube; 47—gas tube; 48—tray; 49—vent; 50—sealing ring; 51—mounting frame.

DETAILED DESCRIPTION OF PREFERRED EMBODIMENTS

Concrete embodiments of the disclosure will be described in detail with reference to the accompanying drawings as follows.

Figure 1:
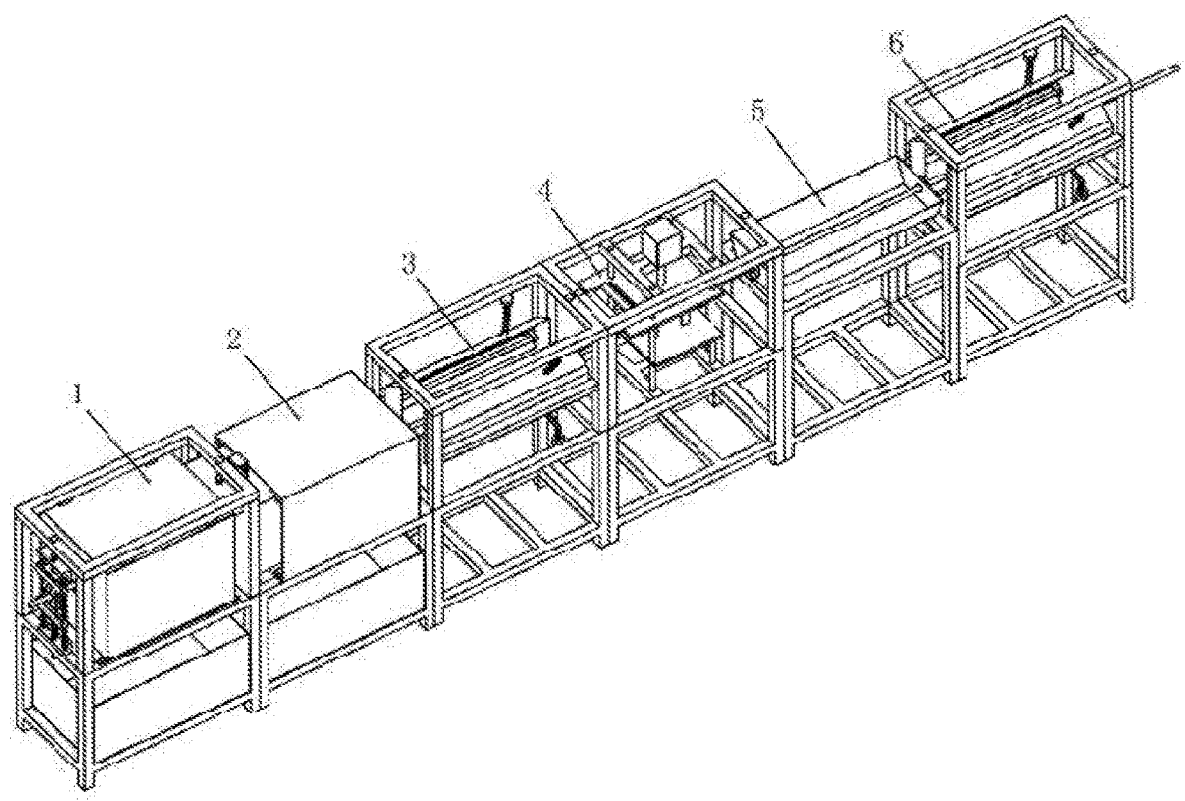
FIG. 1 is a schematic view of an entire structure of the disclosure.
Figure 2:
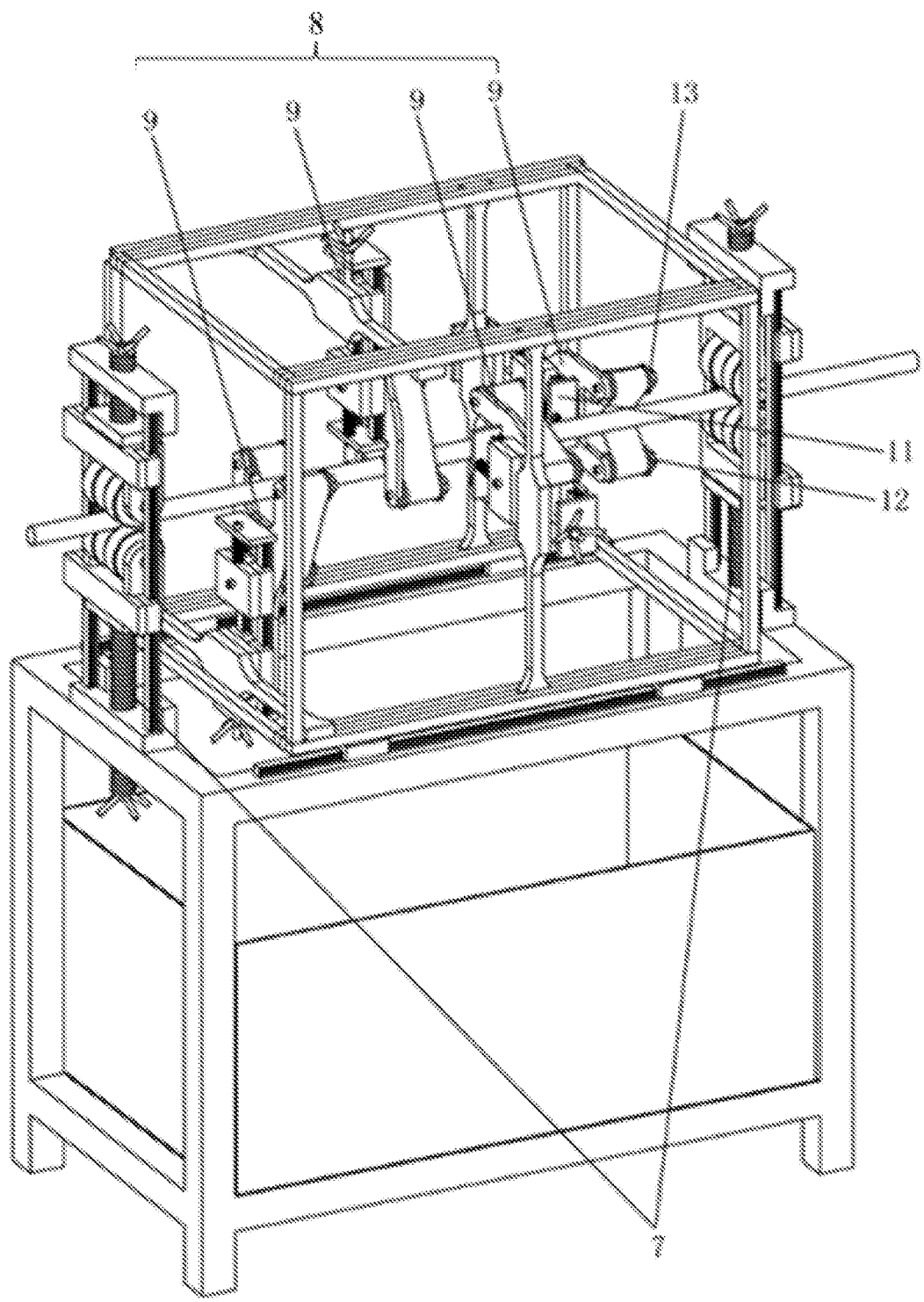
FIG. 2 is a structural schematic view of a polishing device of the disclosure.
Figure 3:
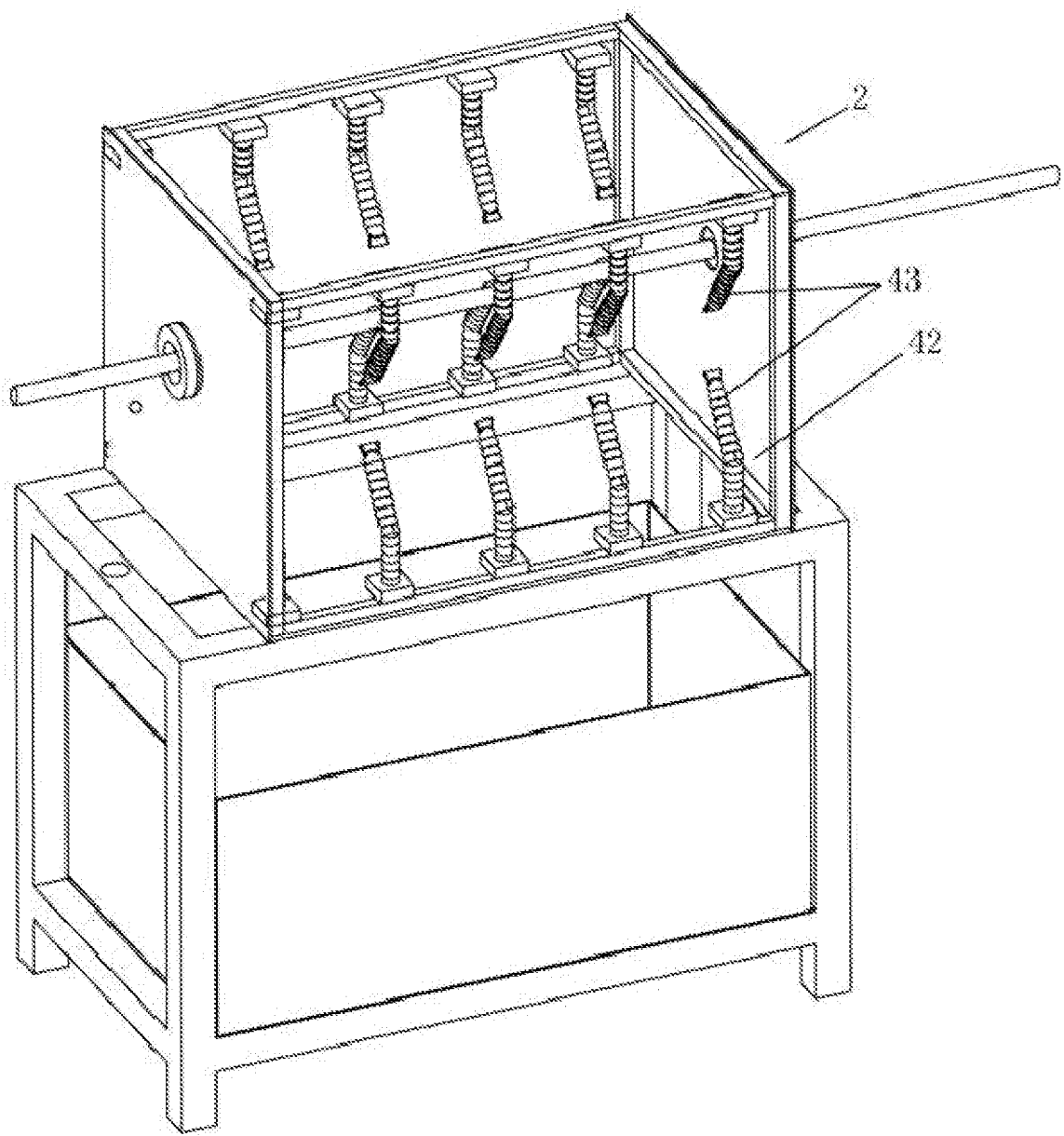
FIG. 3 is a structural schematic view of a washing device of the disclosure.
Figure 4:
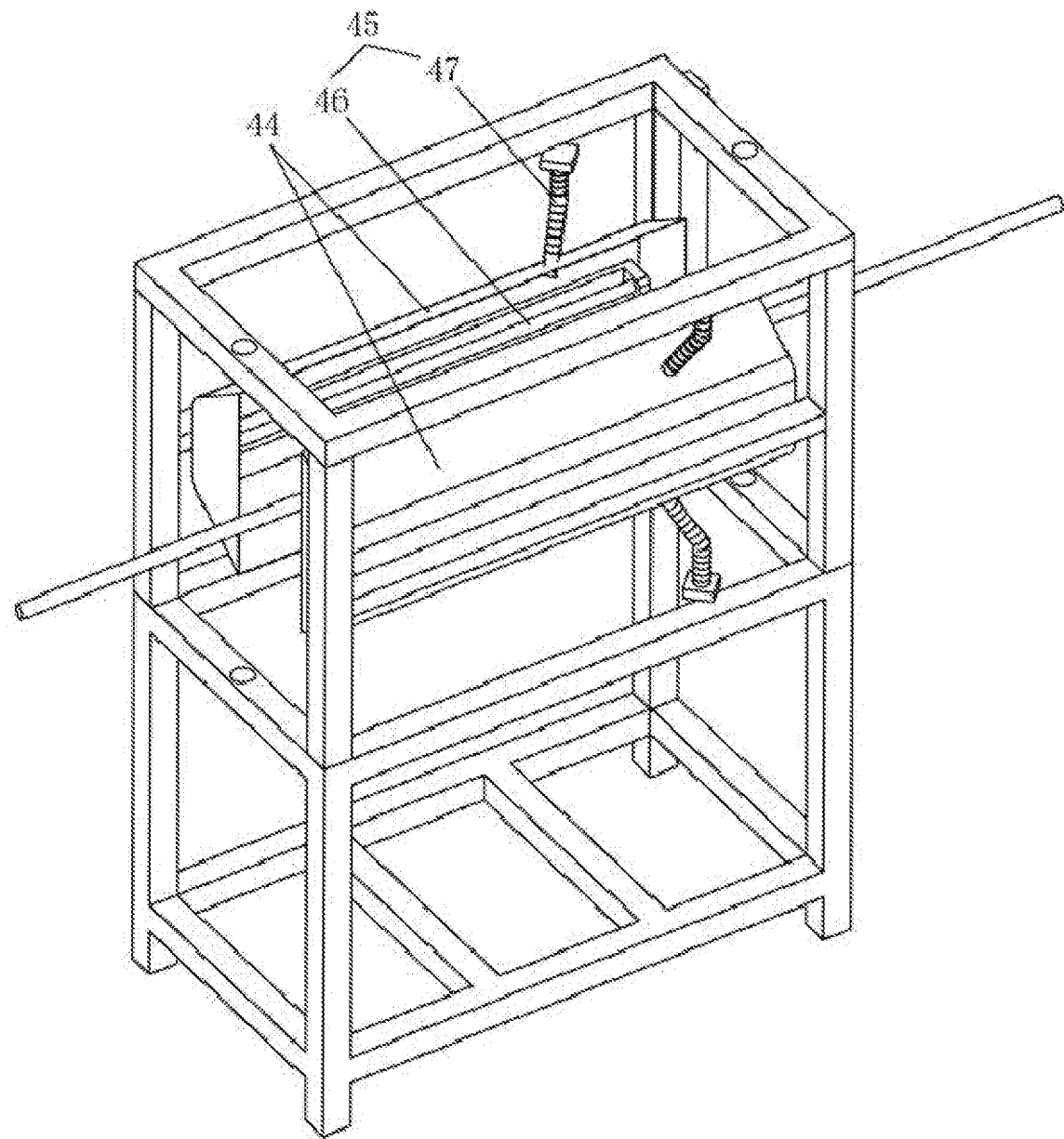
FIG. 4 is a structural schematic view of a drying device of the disclosure.
Figure 5:
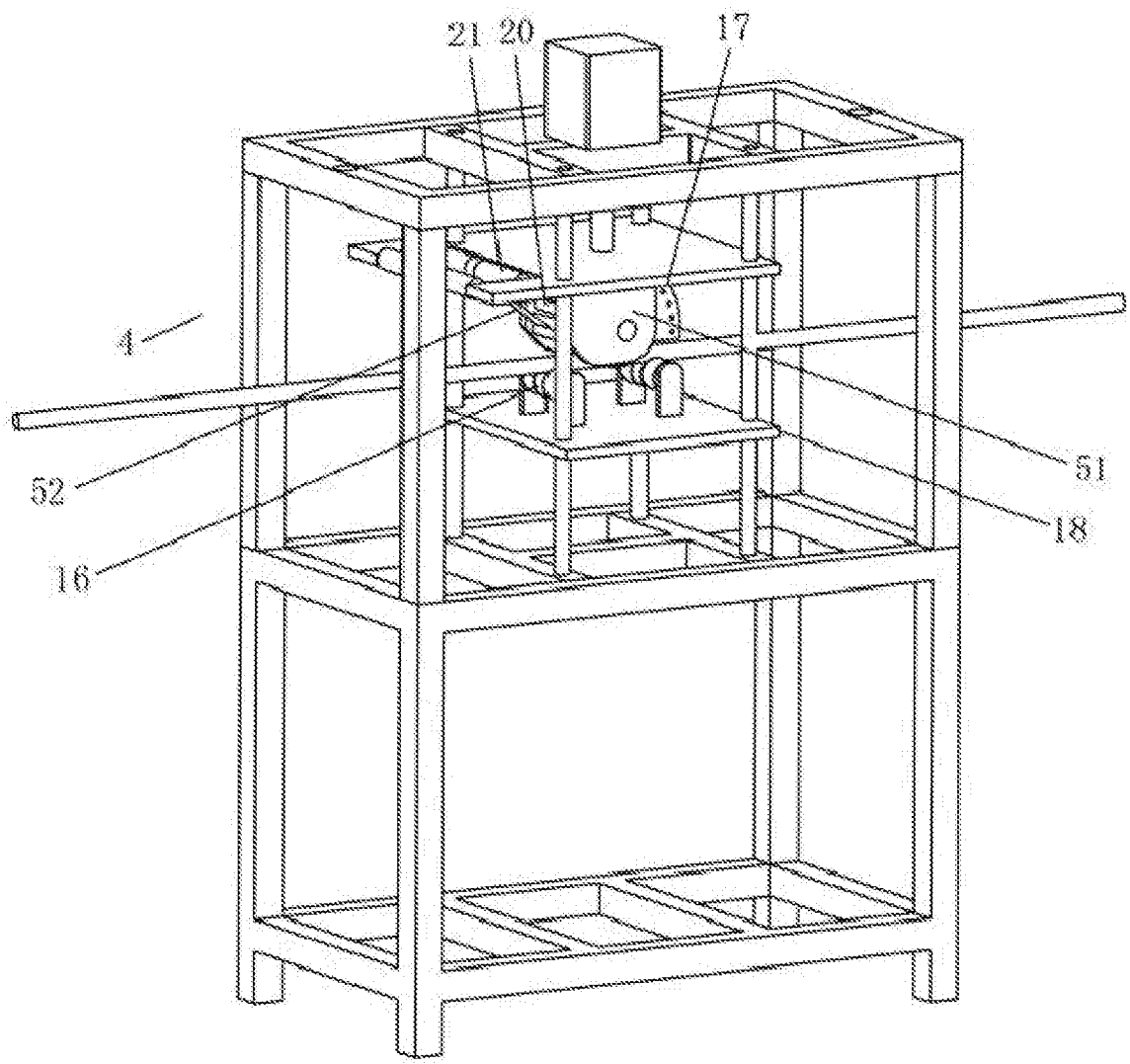
FIG. 5 is a structural schematic view of a printing device of the disclosure.
Figure 6:
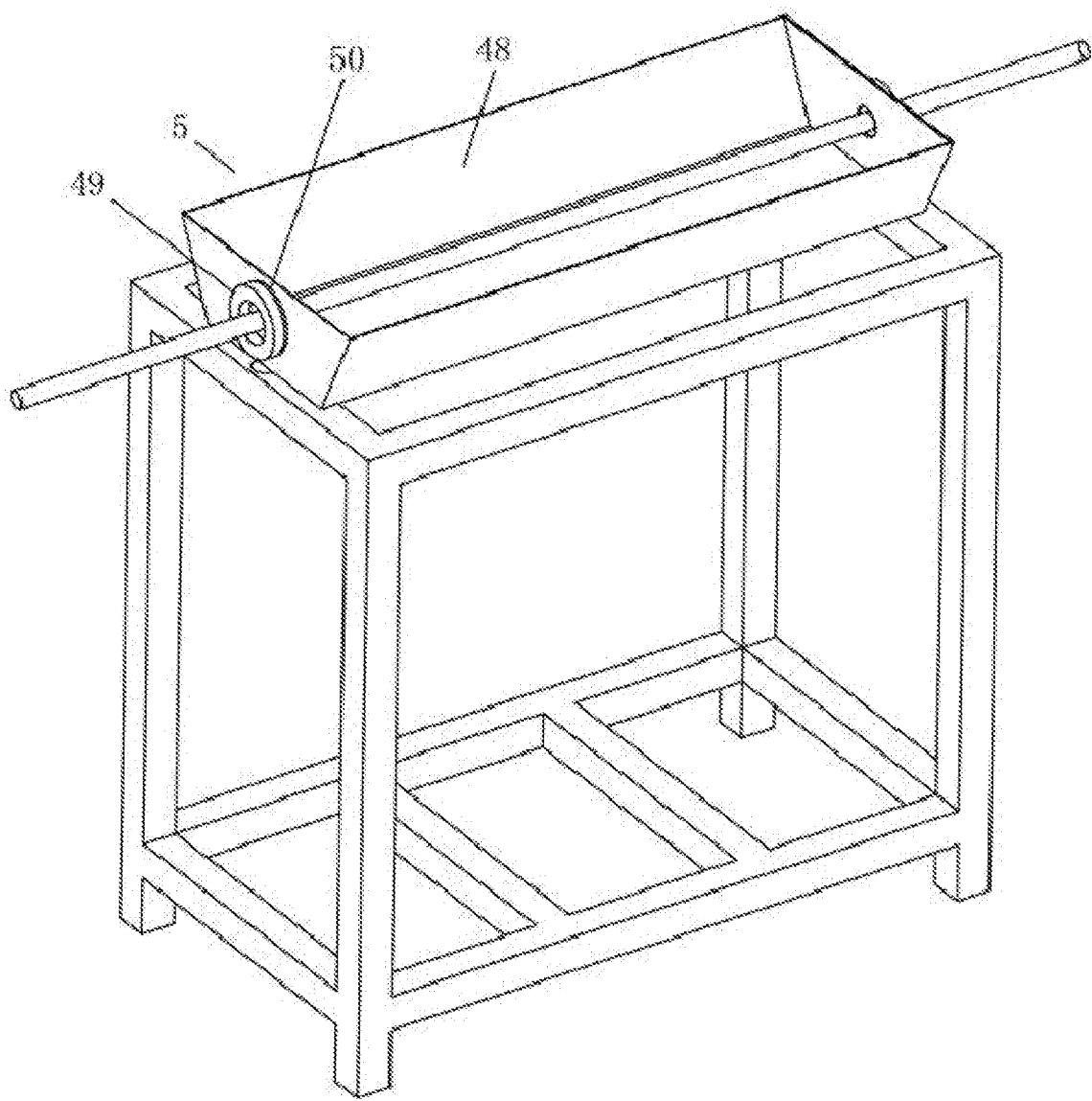
FIG. 6 is a structural schematic view of a painting device of the disclosure.
Figure 7:
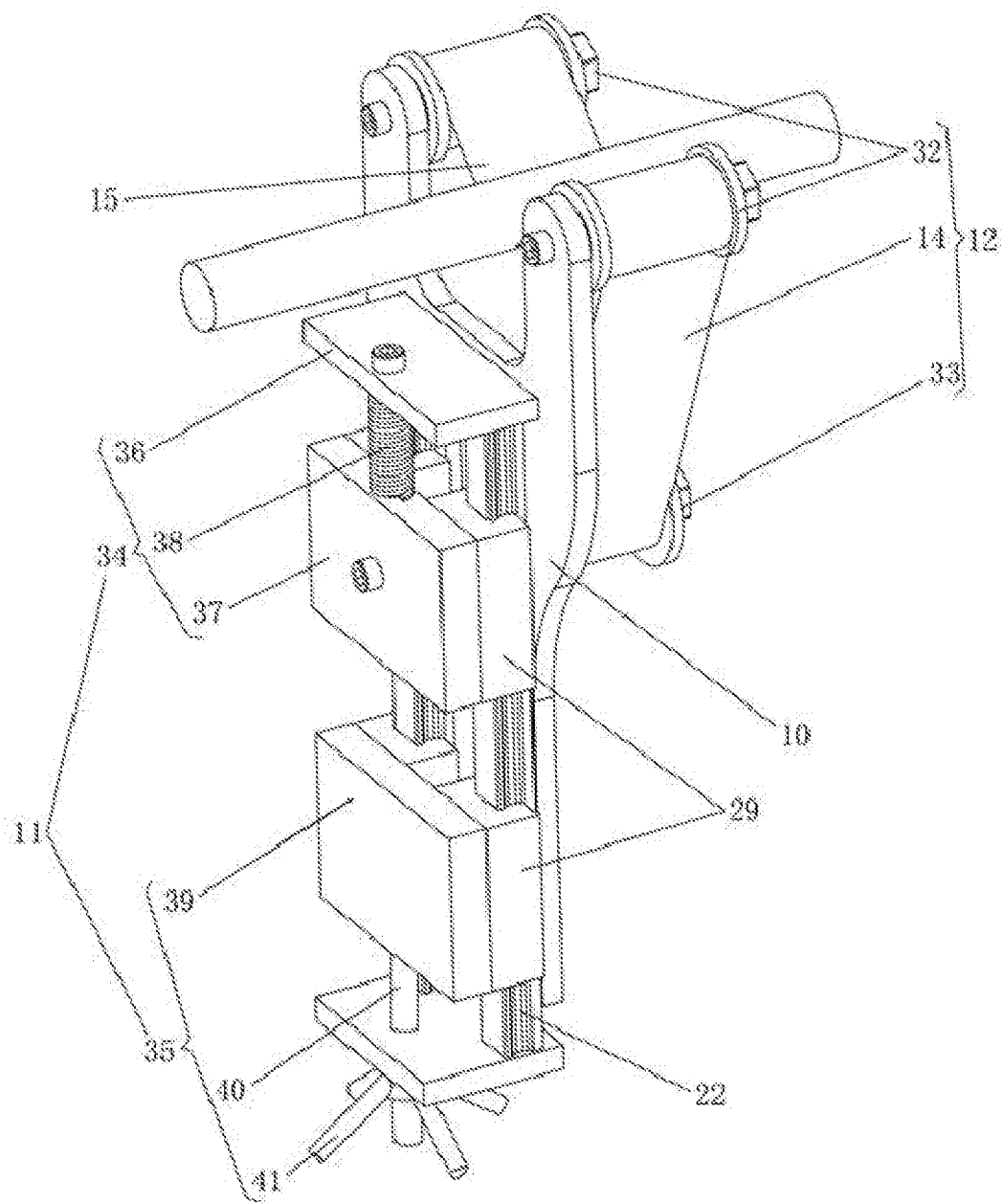
FIG. 7 is a structural schematic view of a polishing assembly of the disclosure.
Figure 8:
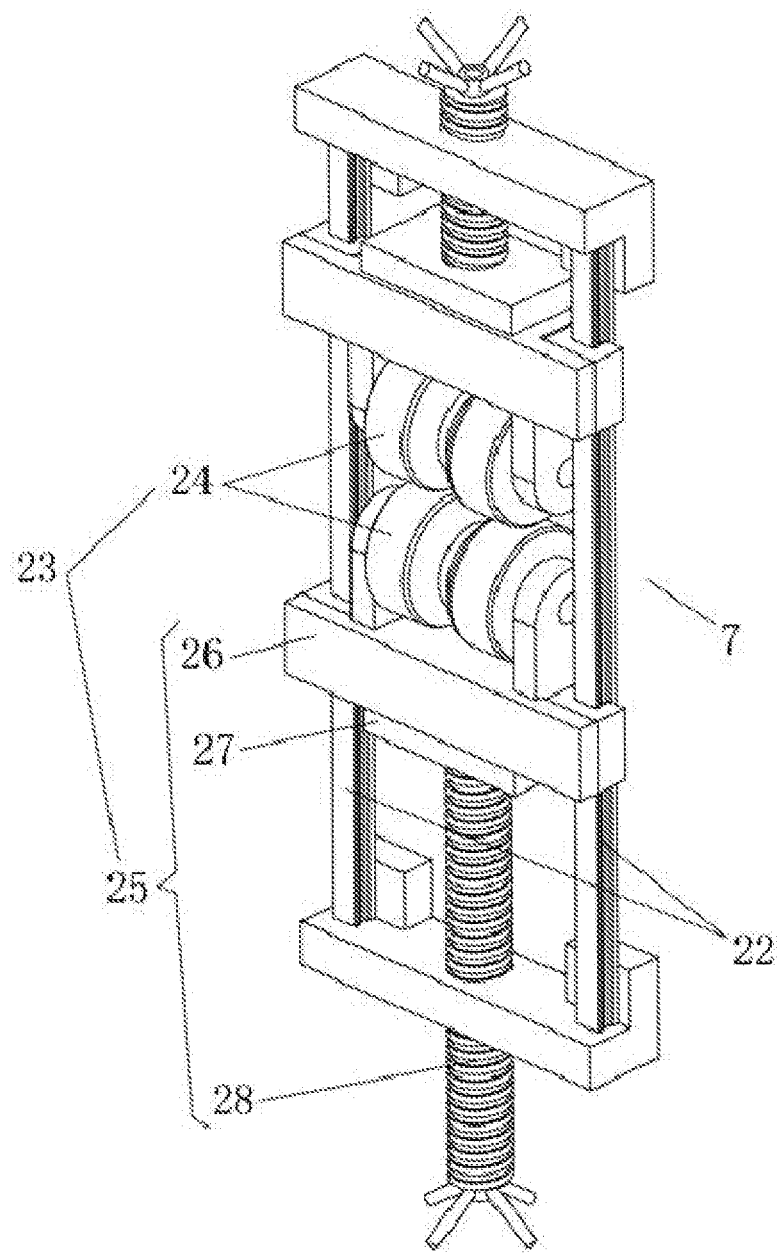
FIG. 8 is a structural schematic view of a feeding mechanism of the disclosure.
Figure 9:
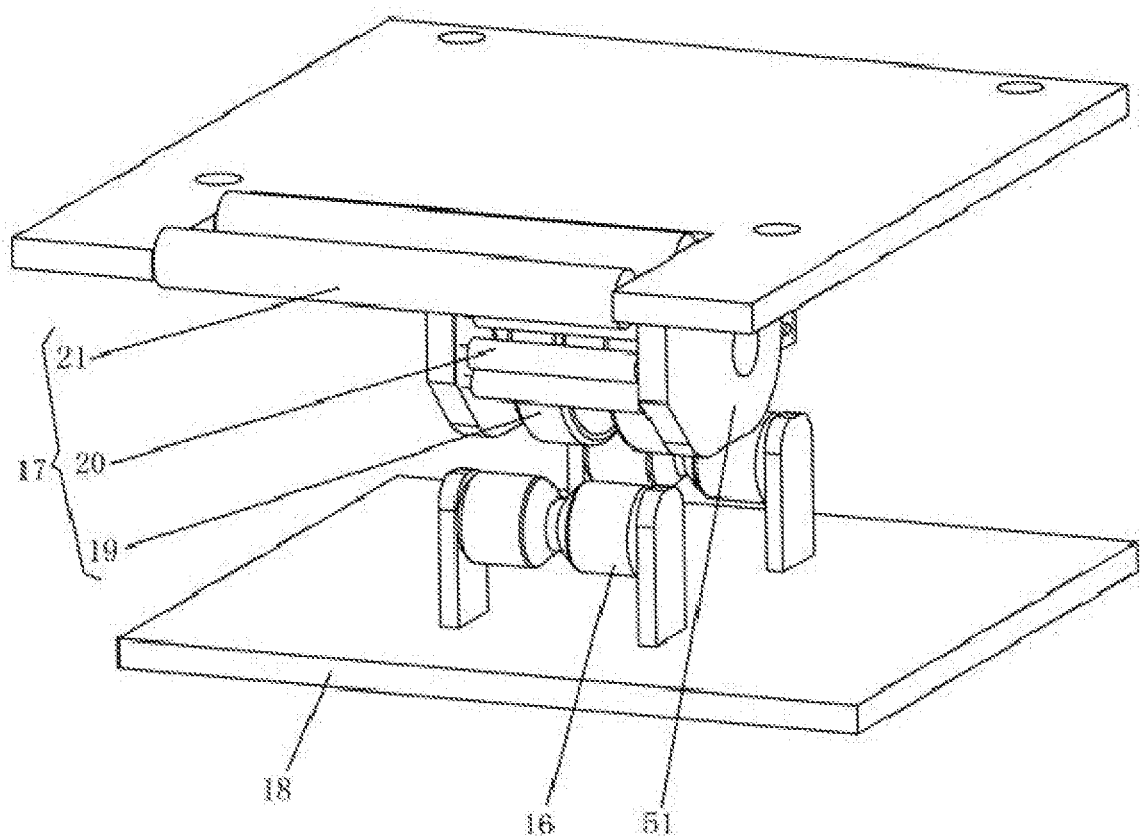
FIG. 9 is a structural schematic view of a supporting mechanism and a rolling-printing mechanism of the disclosure.
Figure 10:
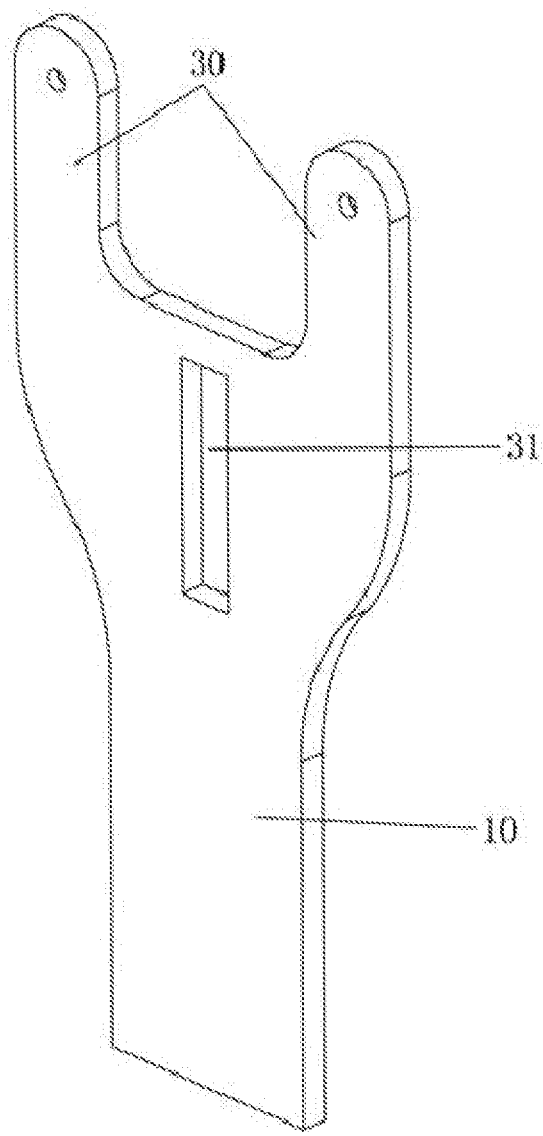
FIG. 10 is a structural schematic view of a positioning plate of the disclosure.

As shown from FIG. 1 through FIG. 10, an automatic processing device of a carbon fiber tube includes a polishing device 1, a washing device 2, a first drying device 3, a printing device 4, a painting device 5 and a second drying device 6 sequentially disposed in that order and machining/processing centers thereof being on a same axis to form an automatic production line.

The polishing device 1 includes feeding mechanisms 7 disposed on two sides of the frame and a positioning-polishing mechanism 8 disposed between the feeding mechanisms 7. The positioning-polishing mechanism 8 consists of several polishing assemblies 9 spaced apart with the same axis. Each of the polishing assemblies 9 is disposed with a positioning plate 10. Both sides of the positioning plate 10 are disposed with the adjusting module 11 and the polishing module 12, respectively. The polishing module 12 is disposed with multiple wheels 13 disposed on the positioning plate 10. The wheels 13 are wrapped by a movable polishing band 14, and the polishing band 14 is formed with an accommodating cavity 15 thereon for holding the product to be polished.

The printing device 4 includes a supporting mechanism 16 and a rolling-printing mechanism 17 mounted on the frame. The frame is disposed with a mounting board 18. The supporting mechanism 16 is assembled on the mounting board 18. The rolling-printing mechanism 17 is located above the supporting mechanism 16 and securely fixated on the frame by a mounting frame 51. The mounting frame 51 is disposed with a roller 19 therein. Two sides of the roller 19 are disposed with an adjusting roller 20 and a heating tube 46, respectively. The mounting frame 51 is disposed with multiple pulling rods 21 mutually parallel. The roller 19, the adjusting roller 20 and the pulling rods 21 are sequentially covered by a printing belt 52.

The feeding mechanism 7 includes a slide rail 22 mounted on the frame and pulling assemblies 23 disposed symmetrically in the slide rail 22. The pulling assembly 23 is disposed with at least two pulling wheels 24 spaced apart and mutually symmetrical. Each of the pulling wheels 24 is disposed with an independent adjusting assembly 25. The adjusting assembly 25 includes a fixating frame 26 configured to secure the pulling wheels 24, a pressing plate 27 and an adjusting spring 28 disposed on the fixating frame 26. The fixating frame 26 is mounted on the slide rail 22 by the slide blocks 29, and regulated to slide along the slide rail 22 by means of the adjusting spring.

The positioning plate 10 entirely appears a Y shape, and the top of which is integrally disposed with mounting arms 30 mutually symmetrical. The middle of the positioning plate 10 between the mounting arms 30 is defined with a slide groove 31. The polishing module 12 includes first rollers 32 each securely disposed on one of the mounting arms 30 and a second roller 33 disposed movably in the slide groove 31. The adjusting module 11 includes the slide rail 22 mounted on the positioning plate 10 and numerous slide blocks 29 mounted on the slide rail 22. The slide blocks 29 are disposed with a first slide assembly 34 and a second slide assembly 35, respectively.

The first slide assembly 34 includes a fixating plate 36, an adjusting plate 37 and a reset spring 38. The fixating plate 36 is securely mounted on the positioning plate 10. The adjusting plate 37 is movably mounted on the slide block 29. The reset spring 38 is mounted between the fixating plate 36 and the adjusting plate 37. The adjusting plate 37 is connected to the second roller 33 by a positioning rod to allow the second roller 33 to move with the adjusting plate 37 along the slide groove 31.

The second slide assembly 35 includes a pushing plate 39 and a slide rod mounted on the pushing plate 39. The pushing plate 39 is mounted on the slide block 29. The pushing plate 39 is disposed with a positioning lock 41.

The washing device 2 includes a tank 42 and numerous nozzles 43 disposed in the tank 42. The nozzles 43 are evenly distributed on each corner in the tank 42 to permit the product to be entirely placed among the nozzles 43 to achieve the omnidirectional spraying and painting.

The first drying device 3 and the second drying device 6 each include covers 44 securely mounted on two sides of the frame. Each of the covers 44 is disposed with a drying mechanism 45 therein. The drying mechanism 45 includes a heating tube 46 mounted in the cover 44 and a gas tube 47 inserted in the cover 44.

The painting device 5 is disposed with a tray 48. Two vents 49 located along the same axis each are defined in one of the two sides of the tray 48. The vent 49 is disposed with a sealing ring 50 therein to prevent overflow.

Water-storing tanks are disposed beneath the polishing device 1 and the washing device 2.

A processing method of a carbon fiber tube includes following steps: (1) polishing, placing the woven and processed carbon fiber tube on the polishing device 1, in the transmission process driven by the feeding mechanism 7, thoroughly polishing the carbon fiber tube by a tetra-directional polishing mechanism of the polishing device 1; (2) washing, washing the surface of the carbon fiber tube after polishing the surface thereof to wipe out polished powders on the surface; (3) drying for the first time, drying the washed carbon fiber tube to prepare the dry status for the next process; (4) printing, printing the pattern on the printing belt onto the surface of the carbon fiber tube in the rotation process of the roller 19 by rolling a successive printing belt with the pattern to be printed over the roller 19, (5) painting, sending the patterned carbon fiber tube into the painting device, during the transmission of the tube, completing painting by passing through the latex paint in the tray 48; (6) drying for the second time, re-drying the painted carbon fiber tube to form the final product and complete the entire process.

A cut step is further included. After the entire process, the tube is cut into pieces according to practical manufacturing requirements.

Specific processing steps of the disclosure are: sending the carbon fiber tube woven by a weaving device to the processing devices of the disclosure by the production line, first, regulating the adjusting assembly 25 in the feeding mechanism 7, and regulating assemblies to spare an accommodating cavity adaptive for production requirements between mutually symmetrical pulling wheels 24. At the moment, the carbon fiber tube enters the feeding mechanism 7 for transmission. The carbon fiber tube is inserted between two pulling wheels 24, and the pulling wheels 24 send the tube to the positioning-polishing mechanism 8 for polishing.

The positioning-polishing mechanism 8 includes four (but unlimited to four) polishing assemblies 9 disposed in different directions. The four polishing assemblies 9 each are located at two sides of the X axis and two sides of the Y axis, so as to allow the positioning-polishing mechanism 8 to form a successive circular polishing trail. The polishing assemblies 9 has a second roller 33 that is adjustable. The second slide assembly 35 is pushed up to the first slide assembly 34 by adjusting the positioning lock 41 in the second slide assembly 35 to trigger the reset spring 38 of the first slide assembly 34 to allow the second roller 33 to slide to a proper position manipulated by the adjusting block accordingly, so as to control the accommodating cavity 15 formed by the polishing band 14 wrapped on the first roller 32 and the second roller 33. The carbon fiber tube is moved by the feeding mechanism 7 to pass through the accommodating cavity 15 of the polishing assembly 9 for thoroughly polishing, and subsequently sent into the washing device 2 by the feeding mechanism 7 for washing.

After washing the polished carbon fiber tube by the washing device 2, the carbon fiber tube enters the first drying device 3 for drying by the heating tube 46 to keep the tube dry. The dried carbon fiber tube is sent forward to the printing device 4 for superficial rolling print. The printing device 4 includes the supporting mechanism 16 and the rolling-printing mechanism 17 mutually formed in coincidence with the diameter of the carbon fiber tube. The carbon fiber tube is placed on the supporting mechanism 16. Meanwhile, one of the pulling rods 21 releases the printing belt 52, and heating the whole coordinated by the heating tube 46 on the other side of the roller 19. The roller 19 in the rolling-printing mechanism 17 constantly presses the carbon fiber tube during rolling. In the rotation process of the roller 19, the pattern of the printing belt 52 is printed on the surface of the carbon fiber tube by rolling print, and the consumed printing belt 52 is automatically rolled back by one pulling rod 21 configured to retrieve to complete the printing process.

The printed carbon fiber tube is sent into the painting device 5. The carbon fiber tube enters the tray 48 filled with the latex paint from the vent 49 in one side thereof, and exits the tray 48 through the vent 49 in the other side of the tray 48, and the carbon fiber tube is enabled to be immersed by the latex paint thoroughly to complete the painting process.

The painted carbon fiber tube subsequently enters the second drying device 6 for secondary drying, the entire subsequent processes have been done after drying the latex paint to form the final carbon fiber tube product. In order to meet the requirement in production, the processed carbon fiber tube will be immediately sent into the cut device to be cut in pieces for collection and delivery.

The contents above purely are preferred embodiments of the disclosure rather than any limitation of the technical scope of the disclosure. A person skilled in the art can obtain some modified embodiments in light of the disclosure. Any modification, equivalent amendment or the like with respect to the embodiments above derived from the technical essence of the disclosure should belong to the scope of the technical solutions of the disclosure.

What is claimed is:

1. An automatic processing device of a carbon fiber tube, comprising: a polishing device, a washing device, a first drying device, a printing device, a painting device and a second drying device sequentially arranged in that order and processing centers thereof being on an identical axis to form an automatic production line;

wherein the polishing device comprises feeding mechanisms disposed on two sides of a frame respectively and a positioning-polishing mechanism disposed between the feeding mechanisms, the positioning-polishing mechanism comprises a plurality of polishing assemblies coaxially disposed and spaced apart from one another, each of the plurality of polishing assemblies is disposed with a positioning plate, an adjusting module and a polishing module are disposed on two sides of the positioning plate respectively, the polishing module is disposed with a plurality of wheels mounted on the positioning plate, the plurality of wheels are wrapped by a slidable polishing band, and the polishing band is formed with an accommodating cavity configured to hold a product to be polished thereon;

wherein the printing device comprises a supporting mechanism and a rolling-printing mechanism mounted on the frame, the frame is disposed with a mounting board, the supporting mechanism is assembled on the mounting board, the rolling-printing mechanism is located above the supporting mechanism and securely assembled on the frame by a mounting frame, the mounting frame is disposed with a roller therein, an adjusting roller and a heating tube are disposed on two sides of the roller respectively, the mounting frame is disposed with a plurality of pulling rods mutually parallel; the roller, the adjusting roller and the plurality of pulling rods are sequentially externally covered by a printing belt.

2. The automatic processing device of a carbon fiber tube according to claim 1, wherein each of the feeding mechanisms comprises a slide rail mounted on the frame and pulling assemblies disposed symmetrically in the slide rail, each of the pulling assemblies is disposed with at least two pulling wheels spaced apart and mutually symmetrical, each of the at least two pulling wheels is disposed with an adjusting assembly that is independent, the adjusting assembly comprises a fixating frame configured to secure the at least two pulling wheels, a pressing plate and an adjusting spring disposed on the fixating frame, the fixating frame is mounted on the slide rail by a slide block, and regulated to slip along the slide rail by the adjusting spring.

3. The automatic processing device of a carbon fiber tube according to claim 1, wherein the positioning plate overall appears a Y shape, a top end of the positioning plate is integrally disposed with mounting arms mutually symmetrical, a middle section of the positioning plate between the mounting arms is defined with a slide groove, the polishing module comprises first rollers securely disposed on the mounting arms respectively and a second roller disposed movably in the slide groove, the adjusting module comprises a slide rail mounted on the positioning plate and a plurality of slide blocks mounted on the slide rail, the plurality of slide blocks are disposed with a first slide assembly and a second slide assembly respectively.

4. The automatic processing device of a carbon fiber tube according to claim 3, wherein the first slide assembly comprises a fixating plate, an adjusting plate and a reset spring, the fixating plate is securely mounted on the positioning plate, the adjusting plate is movably mounted on one of the plurality of slide blocks, the reset spring is mounted between the fixating plate and the adjusting plate, the adjusting plate is connected to the second roller by a positioning rod to allow the second roller to move with the adjusting plate along the slide groove.

5. The automatic processing device of a carbon fiber tube according to claim 3, wherein the second slide assembly comprises a pushing plate and a slide rod mounted on the pushing plate, the pushing plate is mounted on one of the plurality of slide blocks, and the pushing plate is disposed with a positioning lock.

6. The automatic processing device of a carbon fiber tube according to claim 1, wherein the washing device comprises a tank and a plurality of nozzles disposed in the tank, the plurality of nozzles are evenly distributed on each corner in the tank to permit the product to be entirely placed among the plurality of nozzles for achieving omnidirectional spraying and painting.

7. The automatic processing device of a carbon fiber tube according to claim 1, wherein the first drying device and the second drying device each comprise covers securely mounted on two sides of the frame, each of the covers is disposed with a drying mechanism therein, the drying mechanism comprises a heating tube mounted in the cover and a gas tube inserted in the cover.

8. The automatic processing device of a carbon fiber tube according to claim 1, wherein the painting device is disposed with a tray, vents are defined in two sides of the tray respectively in an identical axis, each of the vents is disposed with a sealing ring therein to prevent overflow.

* * * * *